(12) United States Patent
Kondo et al.

(10) Patent No.: US 10,836,436 B2
(45) Date of Patent: Nov. 17, 2020

(54) VEHICLE BODY FRAME STRUCTURE

(71) Applicant: HONDA MOTOR CO., LTD., Tokyo (JP)

(72) Inventors: Takehiro Kondo, Wako (JP); Tomohito Kamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 133 days.

(21) Appl. No.: 16/319,014

(22) PCT Filed: May 23, 2017

(86) PCT No.: PCT/JP2017/019216
§ 371 (c)(1),
(2) Date: Jan. 18, 2019

(87) PCT Pub. No.: WO2018/016172
PCT Pub. Date: Jan. 25, 2018

(65) Prior Publication Data
US 2020/0140015 A1 May 7, 2020

(30) Foreign Application Priority Data
Jul. 21, 2016 (JP) .................. 2016-143760

(51) Int. Cl.
*B62D 21/15* (2006.01)
*B62D 25/16* (2006.01)
(Continued)

(52) U.S. Cl.
CPC .......... *B62D 21/152* (2013.01); *B62D 21/02* (2013.01); *B62D 25/04* (2013.01); *B62D 25/08* (2013.01); *B62D 25/163* (2013.01)

(58) Field of Classification Search
CPC .... B62D 21/152; B62D 25/04; B62D 25/163; B62D 25/08; B62D 21/02
See application file for complete search history.

(56) References Cited

U.S. PATENT DOCUMENTS

2005/0077711 A1 4/2005 Yasui et al.
2013/0249248 A1 9/2013 Ohnaka et al.
(Continued)

FOREIGN PATENT DOCUMENTS

JP H05-024558 A 2/1993
JP H07-228267 A 8/1995
(Continued)

OTHER PUBLICATIONS

International Search Report by ISA/JP dated Jul. 11, 2017, on PCT/JP2017/019216 (5 pages).
(Continued)

*Primary Examiner* — D Glenn Dayoan
*Assistant Examiner* — Melissa Ann Bonifazi
(74) *Attorney, Agent, or Firm* — Rankin, Hill & Clark LLP (57) ABSTRACT

A wheel house lower member of a vehicle body has an upper surface portion and an outer side surface portion. The upper surface portion has an inner curved surface. The wheel house lower member defines a lower bending section on which an inner side ridge is formed between the upper surface portion and the outer side surface portion. The wheel house lower member has: a depression formed on the inner side ridge to induce deformation of the lower bent portion upon receipt of a frontal collision load; and an elongated hole formed through the outer side surface portion and extending substantially in parallel with the depression.

7 Claims, 9 Drawing Sheets

(51) Int. Cl.
*B62D 25/04* (2006.01)
*B62D 25/08* (2006.01)
*B62D 21/02* (2006.01)

(56) References Cited

U.S. PATENT DOCUMENTS

2015/0307134 A1   10/2015  Hirota et al.
2016/0207573 A1   7/2016   Kitakata et al.

FOREIGN PATENT DOCUMENTS

| | | |
|---|---|---|
| JP | H09-207816 A | 8/1997 |
| JP | 2005-112173 A | 4/2005 |
| JP | 2008-213723 A | 9/2008 |
| JP | 2009-023385 A | 2/2009 |
| JP | 2010-064602 A | 3/2010 |
| JP | 2012-096735 A | 5/2012 |
| JP | 2015-054591 A | 3/2015 |
| JP | 2015-209111 A | 11/2015 |
| JP | 2016-052804 A | 4/2016 |

OTHER PUBLICATIONS

Written Opinion by ISA/JP dated Jul. 11, 2017, on PCT/JP2017/019216 (5 pages).

VEHICLE BODY FRAME STRUCTURE

TECHNICAL FIELD

The present invention relates to a vehicle body frame structure.

BACKGROUND ART

There is known a wheel house lower member configured to have a portion having relatively low strength to make that portion buckle in the event of a frontal collision, to thereby absorb collision energy. It can be difficult, however, to produce a bias in the strength distribution of the wheel house lower member, depending on the shape of the wheel house lower member. In such a case, for example, the wheel house lower member can be configured to have two surface sections intersecting each other along a corner line (referred to as ridgeline) and have a through-hole penetrating both the two surface sections including the corner line, to lower the strength of the portion surrounding the through-hole and thus facilitate buckling thereof. However, a through-hole formed on the ridgeline of the wheel house lower member tends to excessively decrease the strength of the portion surrounding the through-hole.

Examples of technique for absorbing collision energy include ones described in Patent Documents 1 and 2. Patent Document 1 discloses a technique of an upper frame with a bead formed as a recessed portion that induces buckling. Patent Document 2 discloses a technique of an apron upper member in which a boundary portion where a planer direction of a flange is changed is used as a weak portion.

PRIOR ART DOCUMENT

Patent Documents

Patent Document 1: Japanese Patent Application Publication No. H7-228267

Patent Document 2: Japanese Patent Application Publication No. 2015-54591

SUMMARY OF INVENTION

Problems to be Solved by the Invention

In the technique disclosed in Patent Document 1, a large shaped bead may facilitate the buckling deformation but decrease the amount of absorbed impact energy. On the other hand, a small shaped bead hardly induces buckling deformation. In the technique disclosed in Patent Document 2, as the weak portion is formed by changing the planar direction of a flange, application of the technique is likely to be restricted with the layout of members.

The present invention has been made to solve such problems and it is an object of the invention to provide a vehicle body frame structure that causes buckling deformation in a consistent manner in the event of vehicle collision with simple structure and ensures absorption of a certain amount of impact energy.

Solution to Problem

To solve the above described problems, one aspect of the present invention provides a vehicle body frame structure including a bending frame with a bending section. The bending frame includes a first panel and a second panel. The first panel includes: a first surface portion having a curved surface on the bending section; and a second surface portion substantially perpendicular to the first surface portion. The first panel has a substantially L-shaped cross section. The second panel includes: a third surface portion having a curved surface on the bending section; and a fourth surface portion substantially perpendicular to the third surface portion. The first panel and the second panel together define a rectangular closed cross-sectional portion. An inner curved surface side ridge is formed on the bending section of the first panel. The bending frame includes: a depression formed on the inner curved surface side ridge, the depression having a substantially oval shape and depressed toward an inside of the rectangular closed cross-sectional portion to induce deformation of the bending section upon receipt of a collision load; a bulge formed on the second surface portion, the bulge located below the depression and protruding outward; and an elongated hole formed through the second surface portion, the elongated hole located below the bulge and extending substantially in parallel with the depression. The depression has a bottom surface with an upwardly directed concave arc shape as viewed in the vehicle width direction. The elongated hole and the bulge each have an upwardly directed concave arc shape substantially in accordance with the upwardly directed concave arc shape of the bottom surface of the depression.

When a collision load is inputted, the depression of the bending section is deformed in such a way as to sink, causing a stress to concentrate on the inner side ridge and thereby causing buckling deformation of the bending section with the depression being a bending point. As the second surface portion has the elongated hole extending substantially in parallel with the depression, the depression is easily deformed in such a way as to sink into the space of the elongated hole. With this structure, the bending section is reliably bent when a predetermined amount of collision load is applied thereto and absorption of a certain amount of impact energy is ensured.

According to the invention, the bulge is easily deformed to facilitate the depression to be deformed toward the elongated hole.

Another aspect of the present invention is that opposite flanges of the first panel and opposite flanges of the second panel are respectively overlapped with and joined to each other to form the rectangular closed cross-sectional portion.

This aspect of the invention facilitates formation of the panels and thus contributes to improving efficiency in the manufacturing of the panels.

Another aspect of the present invention is that an outer curved surface side ridge is formed on the bending section of the second panel, and that a through-hole is formed on the outer curved surface side ridge.

This aspect of the invention makes it possible to easily bend the outer curved surface side of the bending section.

Another aspect of the present invention is that the flanges of the first panel and the second panel have a notch on the bending section This aspect of the invention makes it possible to easily bend the bending section.

Another aspect of the present invention is that the vehicle body frame structure further includes a front side frame and a lateral frame disposed on an outer side of the front side frame in the vehicle width direction. The lateral frame includes: a wheel house upper member with a rear end connected to a front pillar; and a wheel house lower member having an upper bending section, a lower bending section, and a front end. The wheel house lower member extends from the wheel house upper member forward and downward via the upper bending section and the lower bending section. The front end is located at substantially the same position as a front end of the front side frame with respect to a front-rear direction and an up-down direction. The bending section is the lower bending section of the wheel house lower member.

According to this aspect of the invention, in a narrow offset collision, a rotational moment caused by the bending of the lower bending section is applied to the upper bending section. As a result, the wheel house lower member can be bent into a Z shape with the lower bending section and the upper bending section being bending points.

Another aspect of the present invention provides a vehicle body frame structure including: a front side frame, a lateral frame disposed on an outer side of the front side frame in the vehicle width direction. The lateral frame includes: a wheel house upper member with a rear end connected to a front pillar; and a wheel house lower member having an upper bending section, a lower bending section, and a front end. The wheel house lower member extends from the wheel house upper member forward and downward via the upper bending section and the lower bending section. The front end is located at substantially the same position as a front end of the front side frame with respect to a front-rear direction and an up-down direction. The wheel house lower member includes a first panel and a second panel, which define a bending section. The first panel includes: a first surface portion having a curved surface on the bending section; and a second surface portion substantially perpendicular to the first surface portion and defines a substantially L-shaped cross section. The second panel includes: a third surface portion having a curved surface on the bending section; and a fourth surface portion substantially perpendicular to the third surface portion. The first panel and the second panel together define a rectangular closed cross-sectional portion. An inner curved surface side ridge is formed on the upper bending section of the second panel. A stiffener is disposed inside the wheel house lower member. The stiffener extends across the upper bending section in the front-rear direction and covers a peripheral portion of the inner curved surface side ridge of the second panel. A recessed portion is formed on an inner curved surface side ridge of the upper bending section of the second panel to induce deformation of the upper bending section upon receipt of a collision load. The stiffener has a notch avoiding interference with the recessed portion.

According to this aspect of the invention, the recessed portion formed on the inner side ridge of the upper bending section and the notch of the stiffener constitute a weak portion that allows the upper bending section to be bent in a consistent manner without stress being concentrated on front and rear portions of the upper bending section.

Another aspect of the present invention is that the vehicle body frame structure further includes a gusset that connects a front end of the lateral frame to the front end of the front side frame. When a frontal collision load is applied to the vehicle body frame structure, a front section of the lateral frame is bent in a substantially Z shape with the upper bending section and the lower bending section being bending points and a front section of the front side frame is bent in a substantially V shape inward in the vehicle width direction.

This aspect of the invention can cause the front portion of the lateral frame to be bent in a Z shape in an up-down direction and cause the front side frame to be bent inward in the vehicle width direction in a V shape, without interference between these two deformations. As a result, absorption of a certain amount of impact energy is ensured.

Advantageous Effects of Invention

The present invention causes buckling deformation in a consistent manner in the event of vehicle collision with a simple structure and ensures absorption of a certain amount of impact energy.

DESCRIPTION OF EMBODIMENTS

Figure 1:
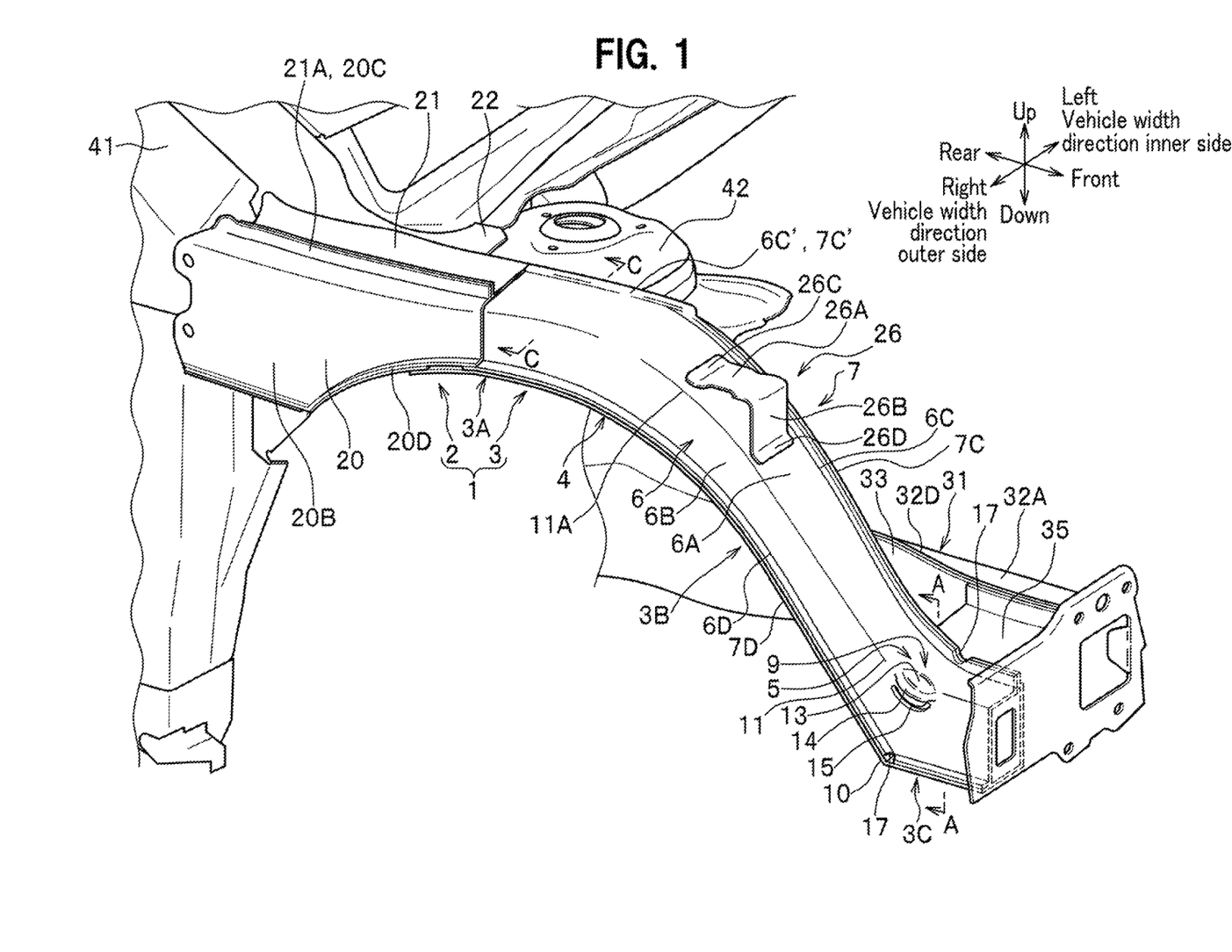
FIG. 1 is a perspective view of a vehicle body frame structure according to a present embodiment.
Figure 2:
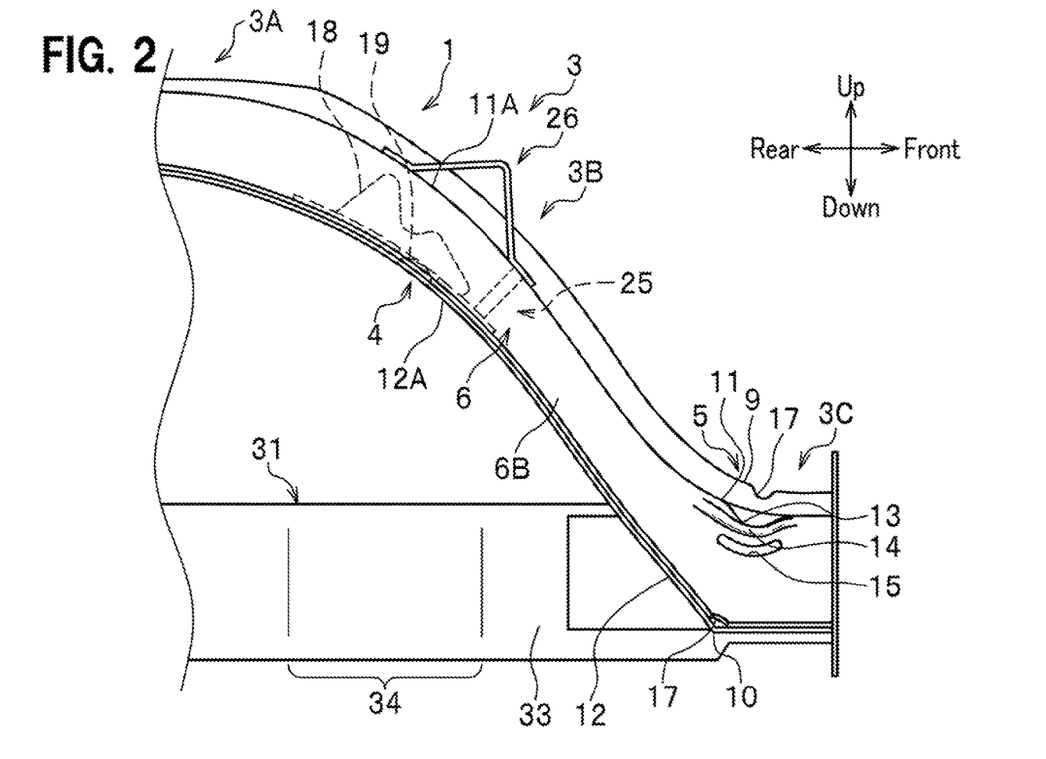
FIG. 2 is a side view of the vehicle body frame structure according to the present embodiment.
Figure 3:
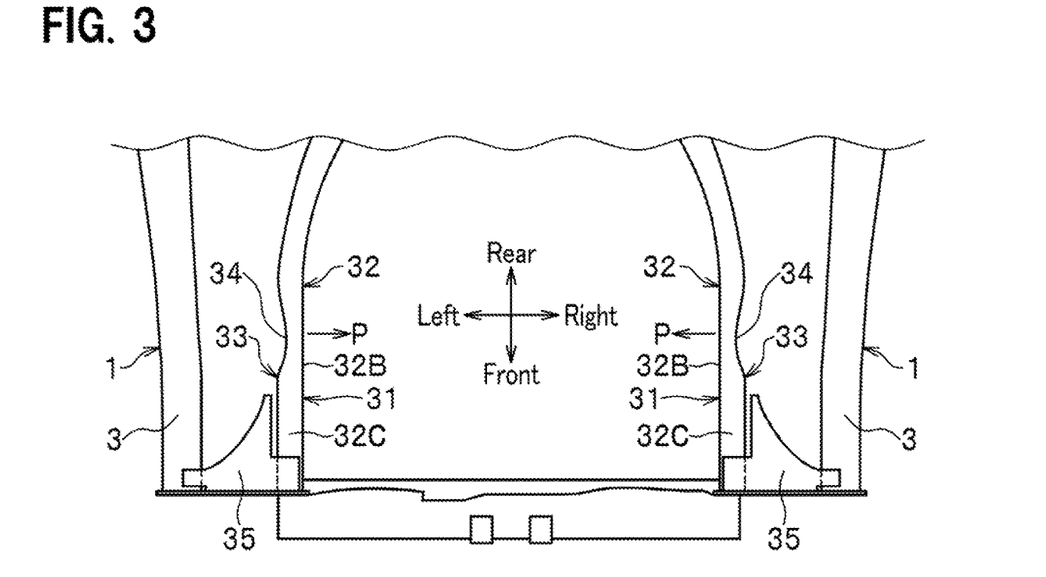
FIG. 3 is a bottom view of the vehicle body frame structure according to the present embodiment.
Figure 4:
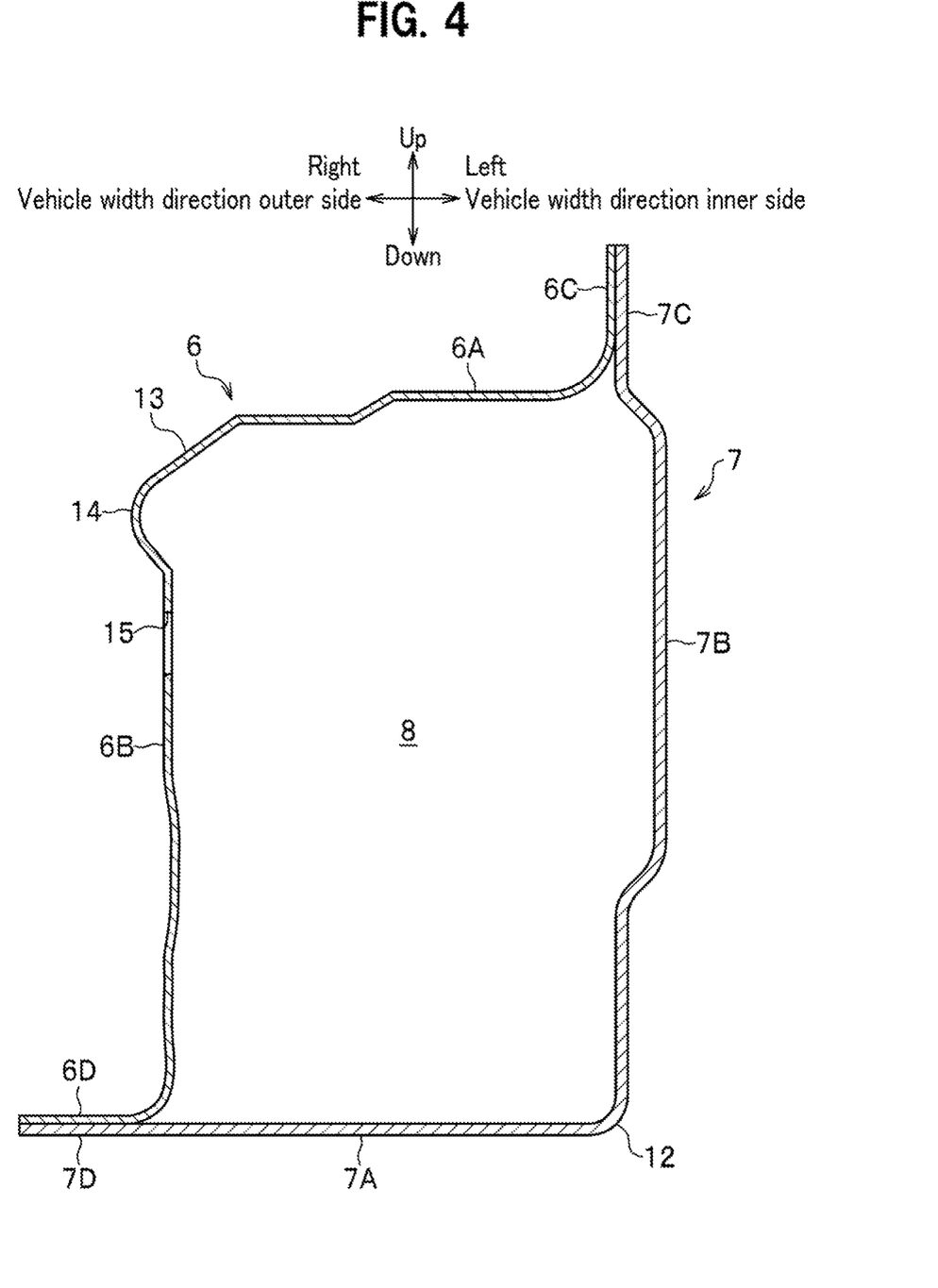
FIG. 4 is a cross-sectional view taken along line A-A of FIG. 1.
Figure 5:
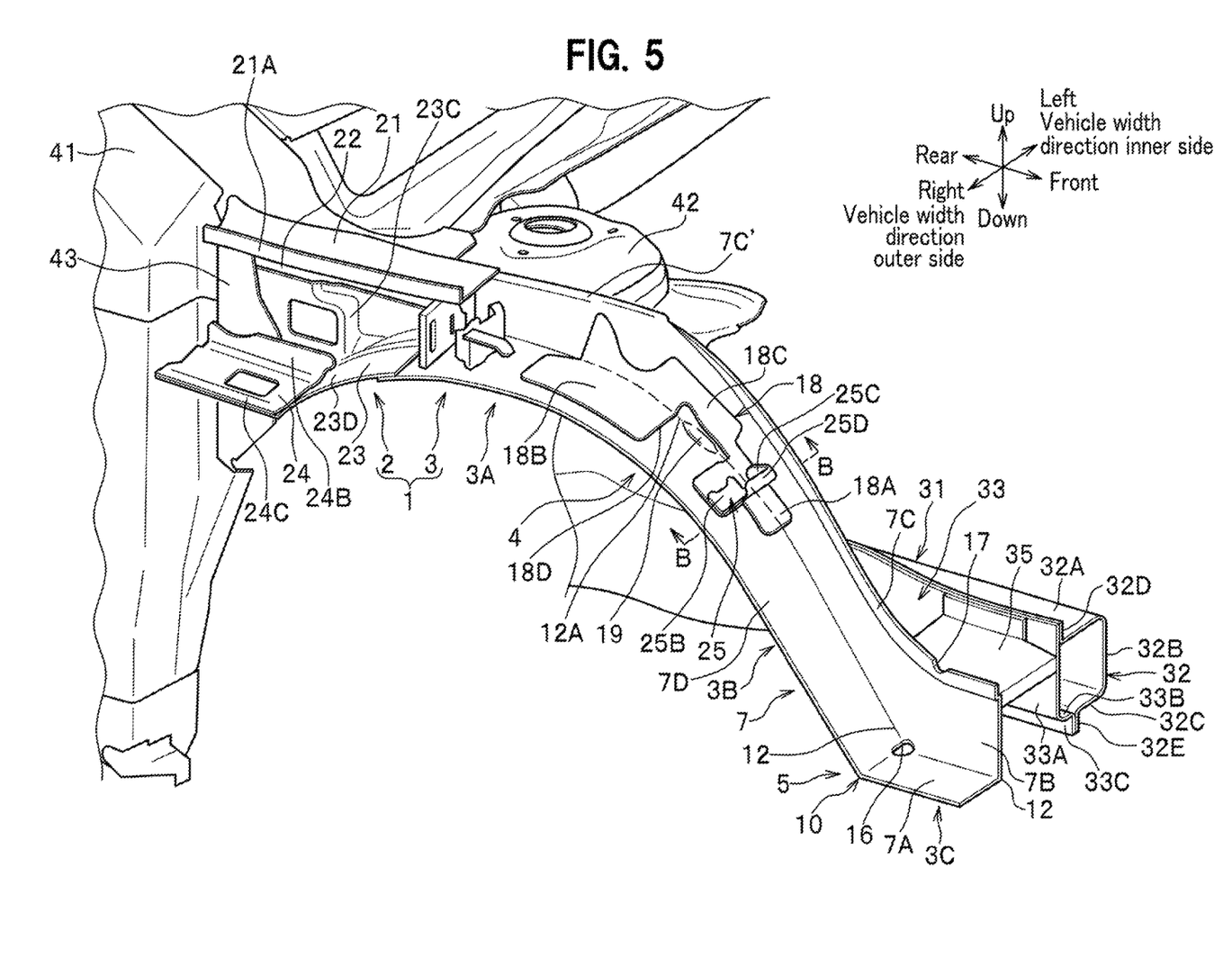
FIG. 5 is a perspective view of the vehicle body frame structure according to a present embodiment, in a state where an outer panel of a lateral frame has been disassembled.

A description will be given of an embodiment in which the present invention is applied to a vehicle front frame structure of an automobile. Referring to FIGS. 1 to 5, a lateral frame 1 and a front side frame 31 are disposed on the vehicle width direction opposite sides of a vehicle in left and right pairs. As shown in FIG. 3, each lateral frame 1 is disposed on the vehicle width direction outer side of the corresponding front side frame 31. FIGS. 1, 2 and 5 show the lateral frame 1 and the front side frame 31 which are disposed on the right side of the vehicle. Hereinafter, descriptions will be given of the lateral frame 1 and the front side frame 31 disposed on the right side of the vehicle. It should be noted that the lateral frame 1 and the front side frame 31 on the left side of the vehicle have a structure left-right symmetric with respect to those on the right side of the vehicle.

Lateral Frame 1

The lateral frame 1 has: a wheel house upper member 2 having a rear end connected to a front pillar 41; a wheel house lower member 3 that has an upper bending section 4 and a lower bending section 5, extends forward and downward from the wheel house upper member 2 via the upper bending section 4 and the lower bending section 5, and has a front end located at substantially the same position as a front end of the front side frame 31 with respect to the vehicle front-rear direction and the up-down direction. The wheel house upper member 2 extends in the vehicle front-rear direction above a wheel house. A front end portion of the wheel house upper member 2 and a rear end portion of the wheel house lower member 3 are overlapped with each other and joined to each other by spot welding or the like.

Wheel House Lower Member (Bending Frame) 3

The wheel house lower member 3 includes: an upper horizontal linear section 3A that extends a certain length horizontally forward from the front end of the wheel house upper member 2; a slanted linear section 3B that extends linearly via the upper bending section 4 forwardly and downwardly from a front end of the upper horizontal linear section 3A; and a lower horizontal linear section 3C that extends, from a lower end of the slanted linear section 3B, a certain length via the lower bending section 5 horizontally forward. A front end of the lower horizontal linear section 3C is located at substantially the same position as the front end of the front side frame 31 with respect to the front-rear direction and the up-down direction. Located on the vehicle width direction inner side of the upper horizontal linear section 3A is a damper base (damper housing) 42 that covers a not-shown damper from above.

Figure 9:
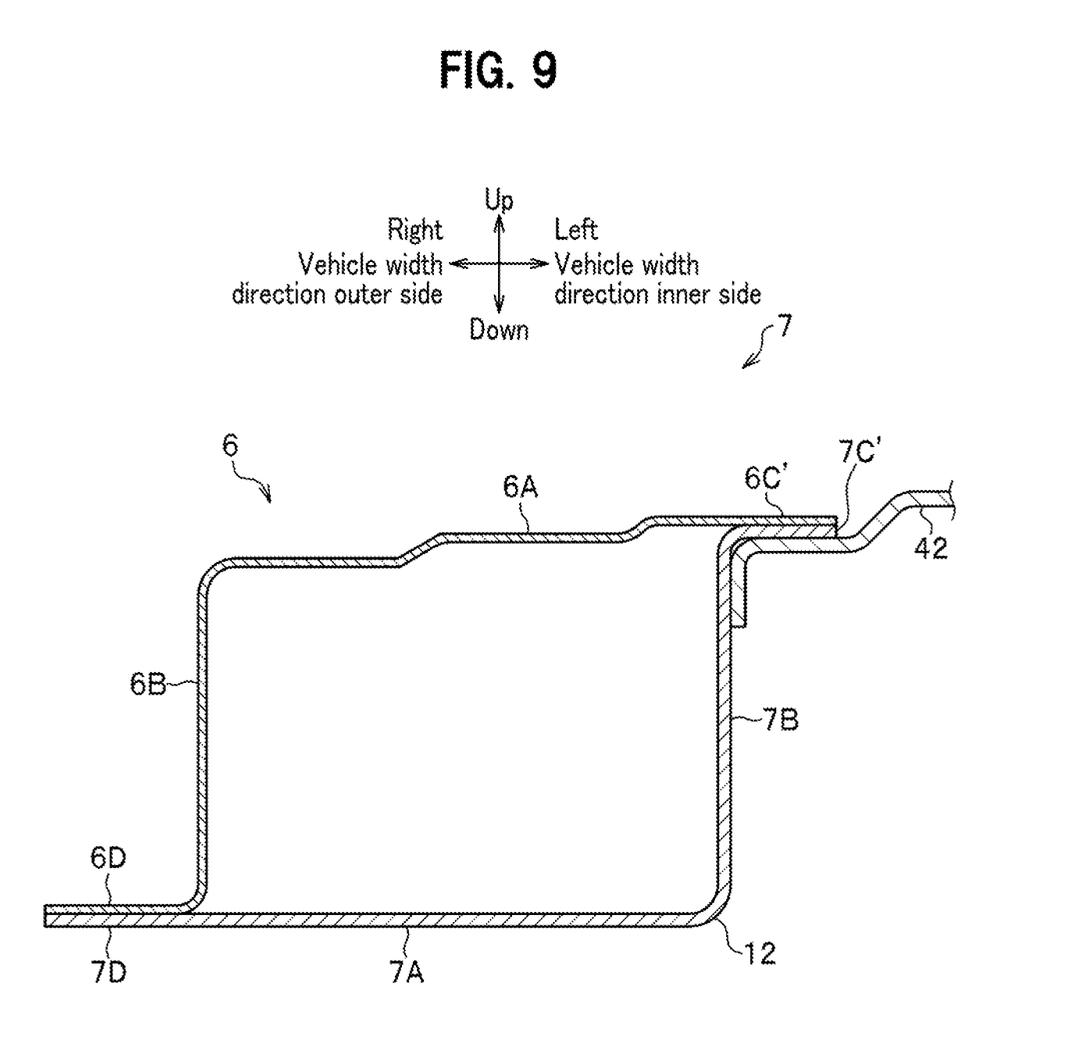
FIG. 9 is a cross-sectional view taken along line C-C of FIG. 1.

The wheel house lower member 3 is made up of an outer panel (first panel) 6 and an inner panel (second panel) 7. As shown in FIG. 4, the outer panel 6 is a member with a substantially L-shaped cross section. The outer panel 6 has: an upper surface portion (first surface portion) 6A extending substantially horizontally in the vehicle width direction; an outer side surface portion (second surface portion) 6B extending vertically downward from a vehicle width direction outer end of the upper surface portion 6A; an upper flange portion 6C constituted by an upwardly oriented flange extending vertically upward from a vehicle width direction inner end of the upper surface portion 6A; and a lower flange portion 6D constituted by a sidewardly oriented flange extending horizontally outward in the vehicle width direction from a lower end of the outer side surface portion 6B. The inner panel 7 is also a member with a substantially L-shaped cross section. The inner panel 7 has: a lower surface portion (third surface portion) 7A extending substantially horizontally in the vehicle width direction; an inner side surface portion (fourth surface portion) 7B extending substantially vertically upward from a vehicle width direction inner end of the lower surface portion 7A; an upper flange portion 7C constituted by an upwardly oriented flange extending vertically upward from an upper end of the inner side surface portion 7B; and a lower flange portion 7D constituted by a sidewardly oriented flange extending horizontally outward in the vehicle width direction from a vehicle width direction outer end of the lower surface portion 7A. It should be noted that, on a portion on the rear side of the upper bending section 4, i.e., on the upper horizontal linear section 3A, the upper flange portions 6C and 7C are respectively constituted by sidewardly oriented flanges 6C' and 7C' extending horizontally in the vehicle width direction and are joined to an upper surface of the damper base 42, as shown in FIG. 9.

In this configuration, the upper flange portions 6C and 7C are welded to each other by spot welding or the like and the lower flange portions 6D and 7D are welded to each other by spot welding or the like. As a result, the upper surface portion 6A and the lower surface portion 7A oppose each other in the up-down direction, and the outer side surface portion 6B and the inner side surface portion 7B oppose each other in the left-right direction, defining a rectangular closed cross-sectional portion 8, which is a hollow cross-sectional portion, in the wheel house lower member 3. FIG. 4 is a cross-sectional view of the lower bending section 5, in which the rectangular closed cross-sectional portion 8 is vertically long. In the slanted linear section 3B, the upper bending section 4, and the upper horizontal linear section 3A, the rectangular closed cross-sectional portion 8 has a slightly shorter vertical length. As described, the wheel house lower member 3 is made up of the substantially L-shaped outer panel 6, which has the first surface portion on which an inner curved surface is defined and the second surface portion, and the substantially L-shaped inner panel 7, which has the third surface portion on which an outer curved surface is defined and the fourth surface portion, and is formed by joining the opposite flanges of the outer panel 6 to the opposite flanges of the inner panel 7 in an overlapping manner. This configuration facilitates formation of the panels and thus contributes to improving efficiency in the manufacturing of the panels.

On the lower bending section 5, the upper surface portion 6A is formed to have an arc-shaped curved surface with an upward concave shape and the lower surface portion 7A is formed to have a downward convex shape. Schematically, as the bent center of the lower bending section 5 is located above the upper surface portion 6A, the bending angle (bending area) of the curved surface of the upper surface portion 6A is smaller than that of the lower surface portion 6B. In the present invention, the curved surface of the upper surface portion 6A, which has the smaller bending angle, is referred to as inner curved surface 9, and the curved surface of the lower surface portion 7A is referred to as outer curved surface 10. The ridge (corner line) defined by the upper surface portion 6a and the outer side surface portion 6B is referred to as inner side ridge 11, and the ridge defined by the lower surface portion 7A and the inner side surface portion 7B is referred to as outer side ridge 12.

On the other hand, in the case of the upper bending section 4, the upper surface portion 6A is formed to have an upward convex shape and the lower surface portion 7A is formed to have an arc-shaped curved surface with an downward concave shape, so that the curved surface of the lower surface portion 7A corresponds to an inner curved surface and the curved surface of the upper surface portion 6A corresponds to an outer curved surface. In the case of the upper bending section 4, a ridge defined by the lower surface portion 7A and the inner side surface portion 7B is referred to as inner side ridge 12A and a ridge defined by the upper surface portion 6A and the outer side surface portion 6B is referred to as outer side ridge 11A.

The inner side ridge 11 of the lower bending section 5 has a depression 13 formed thereon which is recessed toward the inside of the rectangular closed cross-sectional portion 8 to induce buckling deformation of the lower bending section 5 when receiving a frontal collision load. The depression 13 is a depression extending between the upper surface portion 6A and the outer side surface portion 6B and having a substantially oval shape having a major axis substantially along a direction in which the wheel house lower member 3 extends. The outer side surface portion 6B has a bulge 14 that bulges outward in the vehicle width direction below the depression 13, as shown in FIG. 4. The depression 13 is formed by, for example, pressing the inner side ridge 11 downward from the upper surface portion 6A. As a result, a lower portion of the depression 13 located on the outer side surface portion 6B is pushed out outward in the vehicle width direction to form the bulge 14.

The outer side surface portion 6B has an elongated hole 15 formed through the outer side surface portion 6B, located below the bulge 14, and extending substantially in parallel with the depression 13. As the depression 13 has a bottom surface with an upwardly directed concave arc shape as viewed in the vehicle width direction, the elongated hole 15 and the bulge 14 each have an upwardly directed concave arc shape substantially in accordance with that shape. The elongated hole 15 facilitates downward deformation of the depression 13.

As shown in FIG. 5, on the lower bending section 5, the inner panel 7 has a through-hole 16 on the outer side ridge 12. As understood from FIGS. 1 and 2, whereas the inner curved surface 9 of the upper surface portion 6A is formed as a slightly arched surface extending between the lower horizontal linear section 3C and the slanted linear section 3B, a lower curved surface 10 is defined by the lower surface portion 7A (FIG. 4) extending in a substantially planar shape in each of the lower horizontal linear section 3C and the slanted linear section 3B. As shown in FIG. 5, the through-hole 16 is formed on a corner portion defined by the three surfaces of the lower surface portion 7A of the lower horizontal linear section 3C, the lower surface portion 7a of the slanted linear section 3B, and the inner side surface portion 7B of the slanted linear section 3B so that an outer peripheral edge of the through-hole 16 extends across the outer side ridge 12 defined between the lower surface portion 7A and the inner side surface portion 7B of the lower horizontal linear section 3C. The through-hole 16 formed on the side of the outer side ridge 12 induces buckling deformation of the lower bending section 5 in cooperation with the depression 13 formed in the inner side ridge 11.

On the lower bending section 5, the upper and lower flange portions 6C and 6D of the outer panel 6 and the upper flange portion 7C of the inner panel 7 each have a notch 17 with an approximately semicircle shape. The notch 17 of the upper flange portion 6C and the notch 17 of the upper flange portion 7C are located so that they overlap with each other as viewed in the vehicle width direction. These notches 17 also induce buckling deformation of the lower bending section 5.

Stiffener (Reinforcing Member) 18

As shown in FIG. 5, a stiffener 18 extending across the upper bending section 4 in a front-rear direction (direction in which the wheel house lower member 3 extends) and serving as a reinforcing member is disposed in the wheel house lower member 3 by spot welding of the like. The stiffener 18 is attached to portions of the inner panel 7 located opposite across the inner side ridge 12A, i.e., across the inner side ridge 12A and between the lower surface portion 7A and the inner side surface portion 7B. The stiffener 18 has a peripheral portion in which notches or the like are formed so as not to interfere with ribs or holes formed on the inner panel 7. The stiffener 18 has a substantially L-shaped cross section bent at a substantially right angle along the lower surface portion 7A and the inner side surface portion 7B. Specifically, the stiffener 18 has a front rigid portion 18A and a rear rigid portion 18B which are each attached to and between the lower surface portion 7A and the inner side surface portion 7B across the inner side ridge 12A, and has a connection portion 18C attached to at least the inner side surface portion 7B and connecting between the front rigid portion 18A and the rear rigid portion 18B.

The inner side ridge 12A of the upper bending section 4 has a recessed portion 19 that induces buckling deformation of the upper bending section 4 when receiving a frontal collision load. The recessed portion 19 is a depression depressed toward the inside of the rectangular closed cross-sectional portion 8 like the depression 13 of the lower bending section 5. The stiffener 18 has a notch 18D to avoid interference with this recessed portion 19 protruding inside the rectangular closed cross-sectional portion 8. The notch 18D is formed in a substantially rectangular shape extending from an end of the stiffener 18 located on the side of the lower surface portion 7A to the inner side surface portion 7B to avoid the recessed portion 19. In other words, the stiffener 18 is disposed about the recessed portion 19 so that the notch 18D serves as an escape hole for the recessed portion 19. This notch 18A serves as a weak portion that induces buckling deformation of the upper bending section 4.

It should be noted that the stiffener 18 may have a hole instead of the notch 18D to liberate the recessed portion 19. In this case, the connection portion 18C has two portions attached respectively to the inner side surface portion 7B and the lower surface portion 7A. The stiffener 18 may be formed to have a U-shaped cross section to be attached to the lower surface portion 7A, the inner side surface portion 7B, and the outer side surface portion 6B.

Bulkhead (Partition Wall Member) 25

Figure 6:
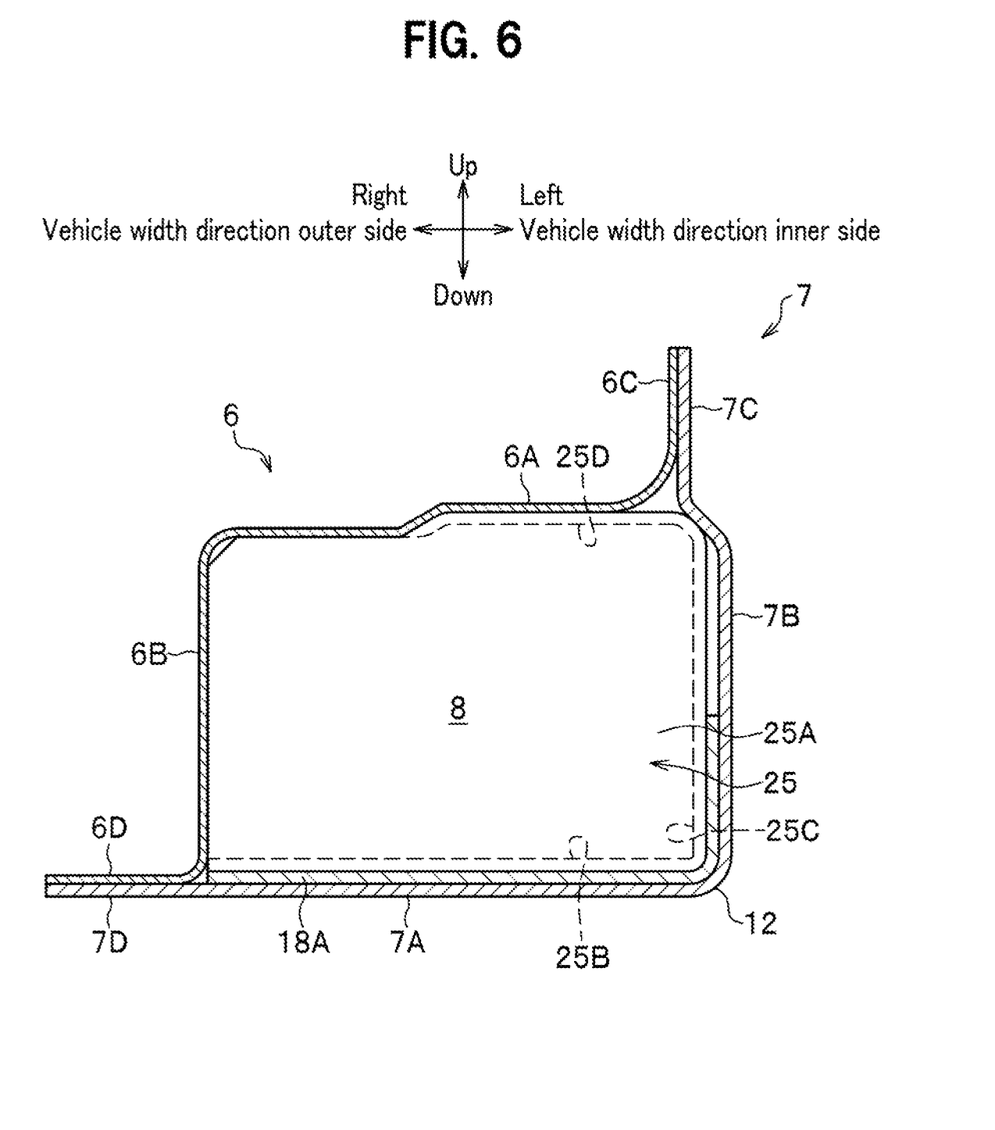
FIG. 6 is a cross-sectional view taken along line B-B of FIG. 5.

A bulkhead 25 for reinforcement is attached to the front rigid portion 18a of the stiffener 18. The bulkhead 25 divides the rectangular closed cross-sectional portion 8 in the direction in which the wheel house lower member 3 extends. As shown in FIGS. 5 and 6, the bulkhead 25 has: a partition wall plate 25A having a shape following the shape of the rectangular closed cross-sectional portion 8; a lower flange portion 25B attached to the front rigid portion 18A on the side of the lower surface portion 7A by spot welding or the like; a side flange portion 25C attached to the front rigid portion 18A on the side of the inner side surface portion 7B by spot welding or the like; and an upper flange portion 25D abutting the upper surface portion 6A of the outer panel 6.

Fender Support Bracket 26

A fender support bracket 26 that supports a not-shown front fender of the vehicle body is disposed on the upper surface portion 6A of the outer panel 6 located above the bulkhead 25. The fender support bracket 26 has: a horizontal surface portion 26A extending substantially horizontally; a vertical surface portion 26B extending vertically downward from a front end of the horizontal surface portion 26A; an upper flange portion 26C formed on a rear end of the horizontal surface portion 26A; and a lower flange portion 26D formed on a lower end of the vertical surface portion 26B. The upper flange portion 26C and the lower flange portion 26D are joined to the upper surface portion 6A by spot welding or the like. The upper flange portion 25D of the bulkhead 25 is located substantially below the lower flange portion 26D.

Wheel House Upper Member 2

Figure 7:
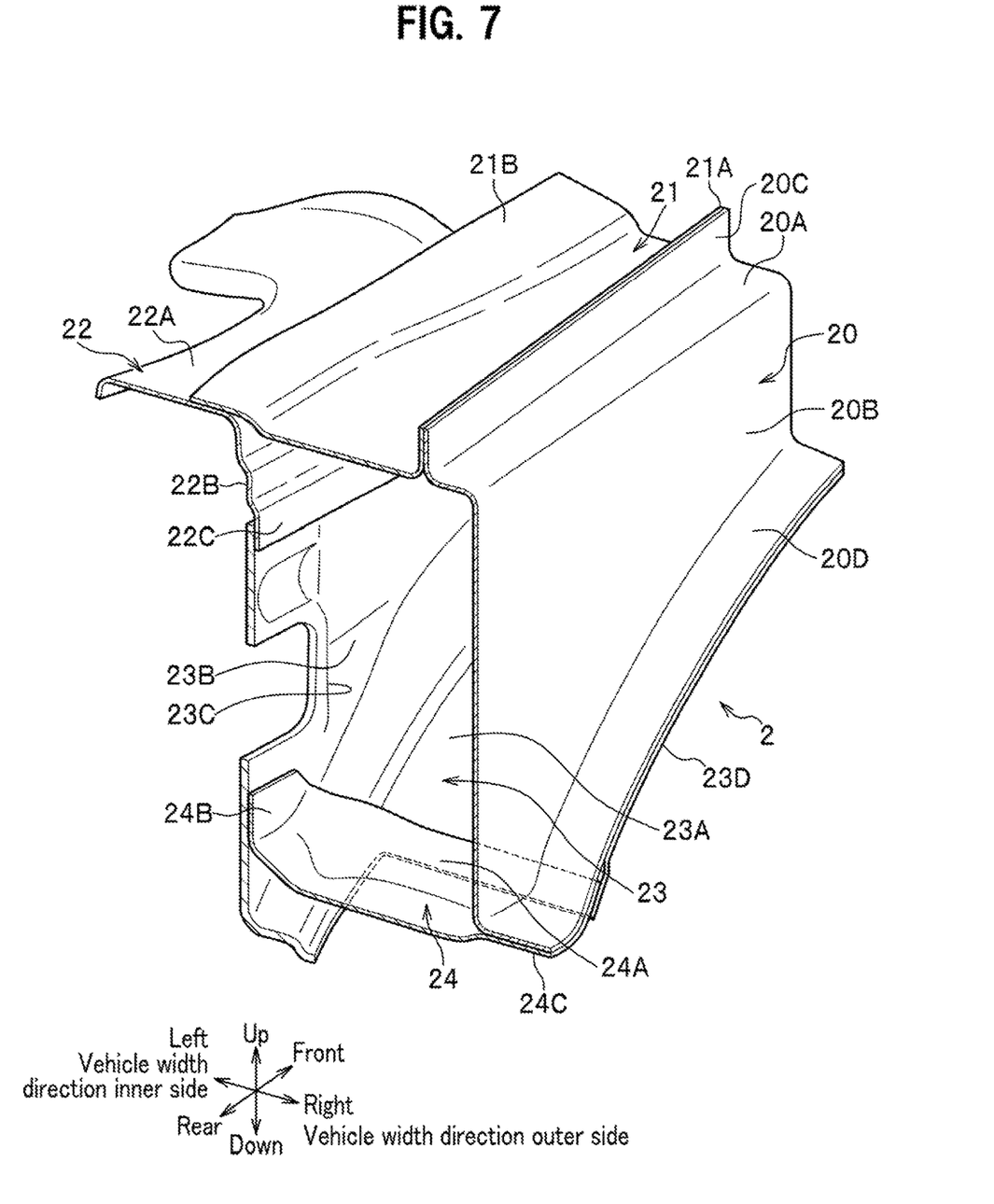
FIG. 7 is a perspective view of a cross section of a wheel house upper member.

The wheel house upper member 2 is disposed on the rear side of the damper base 42 as a whole. Referring to FIGS. 1, 5, and 7, the wheel house upper member 2 has: an outer panel 20 located on the outer side in the vehicle width direction; and a plurality of inner panels of a first inner panel 21, a second inner panel 22, a third inner panel 23, and a fourth inner panel 24, which are located on the inner side in the vehicle width direction. As shown in FIG. 7, the outer panel 20 includes: an upper surface portion 20A extending horizontally in the vehicle front-rear direction; and an outer side surface portion 20B extending vertically downward from a vehicle width direction outer end of the upper surface portion 20A. The upper surface portion 20A has an upper flange portion 20C constituted by an upwardly oriented flange extending vertically upward from a vehicle width direction inner end of the upper surface portion 20A. The outer side surface portion 20B has a lower flange portion 20D constituted by a sidewardly oriented flange extending horizontally outward in the vehicle width direction from a lower end of the outer side surface portion 20B.

The first inner panel 21 extends horizontally in the vehicle front-rear direction at the same height position as the upper surface portion 20A of the outer panel 20. The first inner panel 21 has a vehicle width direction outer end at which an upper flange portion 21A constituted by an upwardly oriented flange extending upward and joined to the upper flange portion 20C of the outer panel 20 is formed, and, a vehicle width direction inner end at which an inner flange portion 21B constituted by a sidewardly oriented flange placed on and joined to an upper surface portion 22A of the second inner panel 22 and the damper base 42 (FIG. 5) is formed. The second inner panel 22 has an upper surface portion 22A extending substantially horizontally and an inner side surface portion 22B extending downward from a vehicle width direction outer end of the upper surface portion 22A, so that the second inner panel 22 defines a substantially L-shaped cross section. The inner side surface portion 22B has a lower end from which a flange portion 22C extends downward.

The third inner panel 23 includes a lower surface portion 23A with an arc shape that extends downward as it extends rearward, and an inner side surface portion 23B extending upward from a vehicle width direction inner end of the lower surface portion 23A, so that the third inner panel 23 defines a substantially L-shaped cross section. The inner side surface portion 23B has a rear end joined to a side extension portion 43 (FIG. 5) of a dash lower panel. Formed at a vehicle width direction outer end of the lower surface portion 23A is a lower flange portion 23D constituted by a sidewardly oriented flange joined to the lower flange portion 20d of the outer panel 20. Formed at an upper end of the inner side surface portion 23B is an upwardly oriented flange joined to the flange portion 22C of the second inner panel 22. The inner side surface portion 23B has a step portion 23C having a step difference in the vehicle width direction. The step portion 23C becomes a bend starting point of buckling deformation when receiving a frontal collision load. The fourth inner panel 24 extends horizontally. The fourth inner panel 24 has a front end at which a front flange portion 24A joined to the lower surface portion 23A of the third inner panel 23 is formed. The fourth inner panel 24 has a vehicle width direction inner end at which an inner flange portion 24B joined to the inner side surface portion 23B of the third inner panel 23 and to the side extension portion 43 of the dash lower panel is formed. The fourth inner panel 24 has a vehicle width direction outer end at which a lower flange portion 24C constituted by a sidewardly oriented flange joined to the lower flange portion 20D of the outer panel 20 is formed.

As understood from the above, the wheel house upper member 2 has: an upper surface defined by the upper surface portion 20A of the outer panel 20 and the first inner panel 21; an outer side surface defined by the outer side surface portion 20B of the outer panel 20; an inner side surface defined by the inner side surface portion 22B of the second inner panel 22 and the inner side surface portion 23B of the third inner panel 23; and a lower surface defined by the lower surface portion 23A of the third inner panel 23 and the fourth inner panel 24, so that the rectangular closed cross-sectional portion is defined inside the wheel house upper member 2. By forming the outer panel 20 with a high-strength steel plate and forming the inner panels 21 to 24 with a copper plate having a weaker strength than the steel plate, it is easy to create a difference in the strength between the vehicle width direction outer side and the vehicle width direction inner side of the cross section of the wheel house upper member 2. Therefore, it is possible to cause buckling deformation of the wheel house upper member 2 in a consistent manner in such a way that the wheel house upper member 2 is bent inward in the vehicle with direction starting from the step portion 23C, which is a weak portion located inward in the vehicle width direction. Thus, it is possible to absorb collision energy efficiently.

Figure 8:
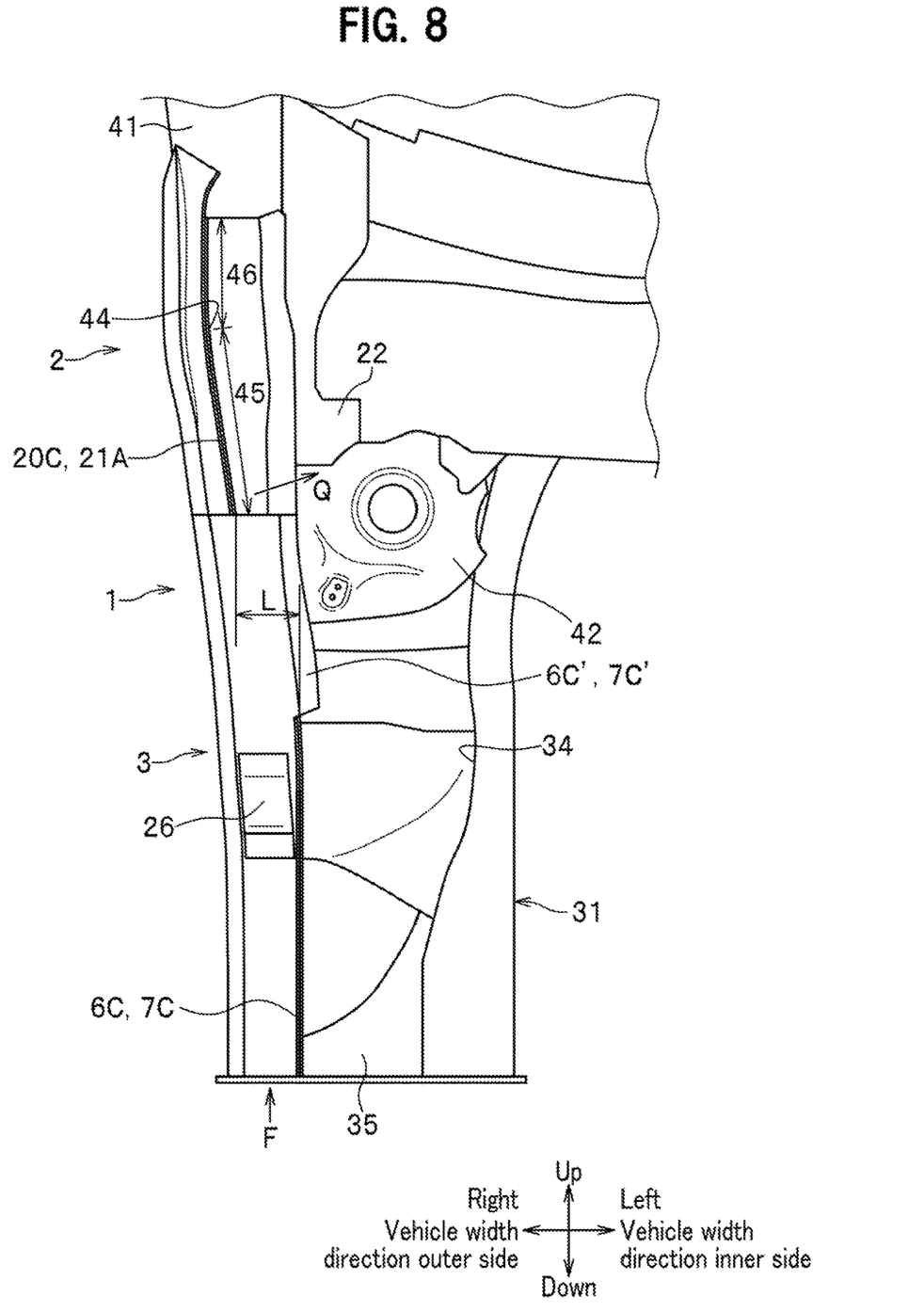
FIG. 8 is a plan view of the vehicle body frame structure according to the present embodiment.

As shown in FIG. 8, the upwardly oriented flanges of the upper flange portions 20C and 21A of the wheel house upper member 2 are offset outward in the vehicle width direction by a distance L or more relative to the upwardly oriented flanges of the upper flange portions 6C and 7C of a front portion of the wheel house lower member 3. The upwardly oriented flanges of the upper flange portions 20C and 21A have a front section 45 and a rear section 46, wherein the front section 45 is bent so that the front section 45 is located inward in the vehicle width direction relative to the rear section 46. Specifically, the upwardly oriented flanges of the upper flange portions 20C and 21A have a bent portion 44, from which the rear section 46 extends in the front-rear direction and from which the front section 45 extends forwardly and inward in the vehicle width direction. The bent portion 44 is located at substantially the same position as the step portion 23C in the front-rear direction.

Front Side Frame 31

Referring to FIGS. 1 to 3 and 5, the front side frame 31 extends in the vehicle front-rear direction and has a front side inner panel 32 and a front side outer panel 33. Referring to FIG. 5, the front side inner panel 32 includes: an upper surface portion 32A extending horizontally; an inner side surface portion 32B extending vertically downward from a vehicle width direction inner end of the upper surface portion 32A; and a lower surface portion 32C extending outward in the vehicle width direction from a lower end of the inner side surface portion 32B, so that the front side inner panel 32 has a substantially U-shaped cross section with an opening located on the outer side in the vehicle width direction. The upper surface portion 32A has an upper flange portion 32D constituted by an upwardly oriented flange extending upward. The lower surface portion 32C has a lower flange portion 32E constituted by a downwardly oriented flange extending downward. The front side outer panel 33 includes: an outer side surface portion 33A extending vertically; a lower surface portion 33B extending inward in the vehicle width direction from a lower end of the outer side surface portion 33A; and a lower flange portion 33C constituted by a downwardly oriented flange extending downward from the lower surface portion 33B. The upper flange portion 32D is joined to an upper end of the front side outer panel 33 to make a flange joint, and the lower flange portion 32E and the lower flange portion 33C are joined to each other to make a flange joint, so that a rectangular closed cross-sectional portion is formed inside the front side frame 31.

As shown in FIG. 3, the front side frame 31 has a narrow portion 34 that induces buckling deformation such that the front side frame 31 is bent inward in the vehicle width direction when receiving a frontal collision load. The inner side surface portion 32B of the front side inner panel 32 extends substantially straight in the vehicle front-rear direction, whereas the front side outer panel 33 is recessed inward in the vehicle width direction in an arch shape in plan view. As a result, the front side frame 31 locally has a portion with a narrow width in the vehicle width direction as the narrow portion 34.

A front end of the wheel house lower member 3 and the front end of the front side frame 31 are coupled to each other via a gusset 35. The wheel house lower member 3 and the front side frame 31 are each joined to the gusset 35 by spot welding, bolt fastening or the like. Description of specifics of the gusset 35 is omitted because they are not related to the objectives of the present invention.

Working

Figure 10A:
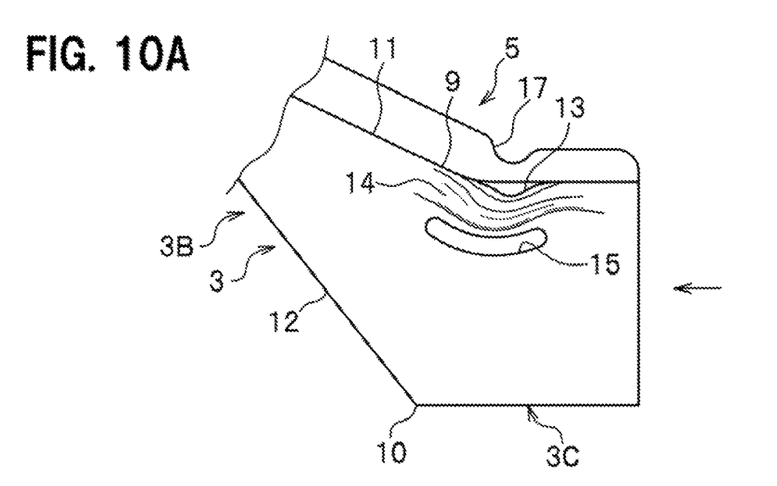
FIGS. 10A, 10B, and 10C are side views illustrating the working of a depression and an elongated hole.
Figure 10B:
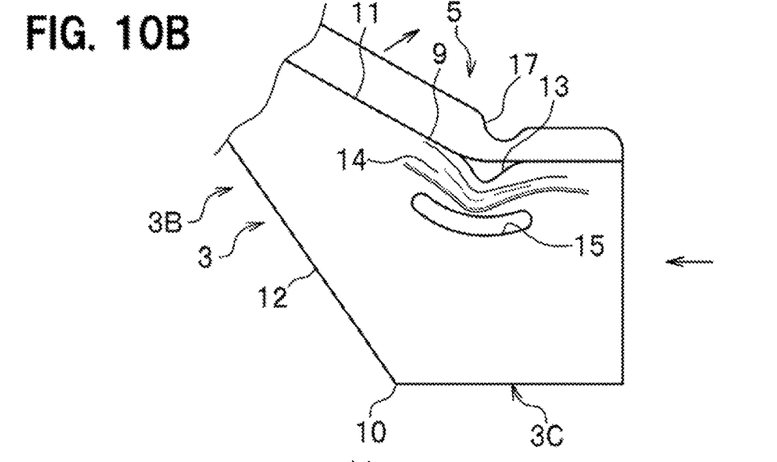
Figure 10C:
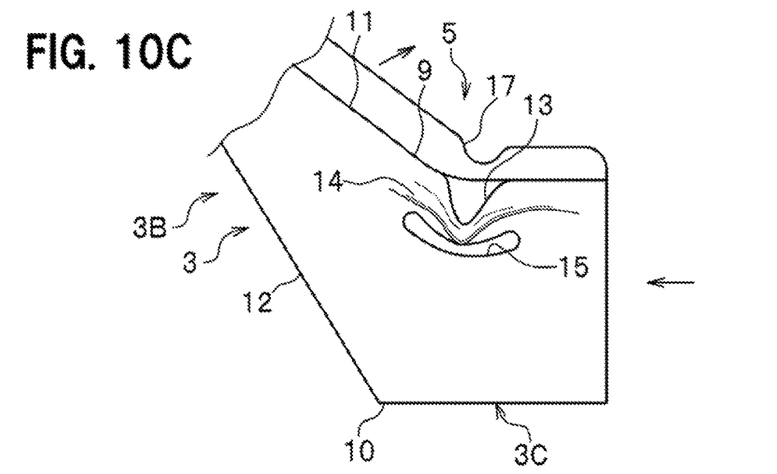

When the front end of the wheel house lower member 3 of the lateral frame 1 receives a frontal collision load in the rearward direction, the depression 13 of the lower bending section 5 is deformed downward as shown in the sequence of FIGS. 10A to 10C, resulting in a concentration of stress on the inner side ridge 11. As a result, the wheel house lower member 3 is bent in such a manner that the slanted linear section 3B rises forward, resulting in buckling deformation. As the elongated hole 15 is formed on the outer side surface portion 6B at a portion thereof below the depression 13 and extends substantially in parallel with the depression 13, the depression 13 is easily deformed downward in such a manner as to sink into the hole space of the elongated hole 15. As a result, the wheel house lower member 3 is reliably bent at the lower bending section 5 when a predetermined amount of collision load is applied, and the amount of absorbed impact energy is increased.

As the bulge 14 is formed between the depression 13 and the elongated hole 15, the bulge 14 is easily deformed to facilitate the deformation of the depression 13 toward the elongated hole 15. As the through-hole 16 is formed on the outer side ridge 12 of the lower bending section 5, the outer curved surface 10 side of the lower bending section 5 is easily bent. In addition, as the upper flange portion 6C, the lower flange portion 6D, and the upper flange portion 7C have notches 17, the lower bending section 5 is easily bent.

Even in a narrow offset collision (also called small overlap collision or short overlap collision), a rotational moment caused by the bending of the lower bending section 5 is applied to the upper bending section 4. As a result, a so-called Z bend, in which the slanted linear section 3B is deformed in such a way as to rise forward with the lower bending section 5 and the upper bending section 4 being the bending points, is reliably caused in the wheel house lower member 3.

Next, the working of the flange portions is described. As the slanted linear section 3B and the lower horizontal linear section 3C of the wheel house lower member 3 are arranged at locations where clearances from peripheral members such as a headlight are readily provided, the upper flange portions 6C and 7C of the slanted linear section 3B and the lower horizontal linear section 3C can be formed as upwardly oriented flanges. With this structure, the section modulus thereof is increased against the Z-shaped bending of the wheel house lower member 3 due to a narrow offset collision, resulting in an increase in the amount of absorbed impact energy.

On the other hand, as an engine hood not-shown is arranged above the upper horizontal linear section 3A of the wheel house lower member 3, the upper flange portions 6C and 7C are formed as the sidewardly oriented flanges 6C' and 7C' to provide clearance between a lower surface of the engine hood and the upper flange portion 6C. Therefore, it is possible to provide a margin for the engine hood to be depressed downward due to an external force applied thereto. By joining the sidewardly oriented flanges 6C' and 7C' to an upper surface of the damper base 42, it is possible to inhibit excessive deformation of the upper horizontal linear section 3A in the event of frontal collision.

In the case of the wheel house upper member 2, as the upper flange portions 20C and 21A are formed as upwardly oriented flanges, the wheel house upper member 2 can be bent in the vehicle width direction in rear of the damper base 42 in a consistent manner, without the impact energy absorption function being obstructed. In particular, the upwardly oriented flanges of the upper flange portions 20C and 21A of the wheel house upper member 2 are offset outward in the vehicle width direction by a distance of L or more relative to the upwardly oriented flanges of the upper flange portions 6C and 7C of the wheel house lower member 3, and the upwardly oriented flanges are bent at the bent portion 44 so that the front section 45 is located inward in the vehicle width direction relative to the rear section 46. As a result, upon receipt of a frontal collision load F as shown in FIG. 8, the front section 45 can be bent inward (direction represented by arrow Q) into the inside of the vehicle with the bent portion 44 and the step portion 23C (FIG. 5) being the bending points in a consistent manner.

The lower flange portions 20D, 23D, and 24C of the wheel house upper member 2 and the lower flange portions 6D and 7D of the wheel house lower member 3 are each formed as a sidewardly oriented flange over the entire length of each. With this configuration, even in a case in which the upper flange portions have different orientations (in a case in which an upwardly oriented flange and a sidewardly oriented flange are provided like the embodiment), the outer panel is readily attached to the inner panel from the outside in the vehicle width direction and a hollow cross-sectional portion extending in the lateral frame 1 is created.

Next the working of the stiffener 18 is described. In the upper bending section 4, as the connection portion 18C of the stiffener 18 is attached to the inner side surface portion 7B so as not to interfere with the inner side ridge 12A, the connection portion 18C is easily deformed upon receipt of a shearing load. Therefore, while ensuring the rigidity of the front side lower member 3 with the stiffener 18, the front side lower member 3 can be bent in a consistent manner at the location where the connection portion 18C is arranged. Therefore, the front rigid portion 18A and the rear rigid portion 18B need not be extended in the front-rear direction only for the purpose of creating a difference in the strength distribution from the bending point. Thus, the stiffener 18 can be reduced in size and weight.

The recessed portion 19 is formed on the inner side ridge 12A and the notch 18D of the stiffener 18 is formed so as to surround the recessed portion 19, i.e., the stiffener 18 is arranged so as to surround the recessed portion 19. With this structure, both the recessed portion 19 and the notch 18D together define a weak portion, allowing the upper bending section 4 to be bent in a consistent manner without stress being concentrated on front and rear portions of the upper bending section 4.

The bulkhead 25 is disposed on the front rigid portion 18A of the stiffener 18, which increases the difference in the strength between the front rigid portion 18a and a cross-sectional portion of the wheel house lower member 3 at which the connection portion 18C is located. With this structure, the front side lower member 3 can be bent in a consistent manner at the location where the connection portion 18C is arranged. By disposing the fender support bracket 26 on a portion of the upper surface portion 6A of the wheel house lower member 3 which is located over the bulkhead 25, the rigidity of the fender support bracket 26 attached to the wheel house lower member 3 can be increased.

Next, the working of the front side frame 31 is described. In the event of frontal collision, a front portion of the front side frame 31 is bent inward in the vehicle width direction (direction indicated by the arrow P in FIG. 3) in a V-shape with the narrow portion 34 being the bending point. Thus, the structure can cause the front portion of the lateral frame 1 to be bent in a Z shape in the up-down direction and cause the front side frame 31 to be bent inward in the vehicle width direction in a V shape, without interference between these two deformations. As a result, absorption of a certain amount of impact energy is ensured.

A preferred embodiment of the present invention has been described. In the embodiment, the depression 13 is formed on the lower bending section 5, on the inner side ridge 11 defined by an upper surface (upper surface portion 6A) and an outer surface (outer side surface portion 6B), and the elongated hole 15 is formed on the outer surface. However, for example, by changing flange portions of the outer panel 6 and the inner panel 7, the depression 13 may be formed on an inner side ridge defined by the upper surface and an inner side surface, and the elongated hole 15 may be formed on the inner side surface. In addition, the depression 13 may be formed on both the inner side ridges and the elongated hole 15 may be formed on the outer side surface and the inner side surface.

REFERENCE SIGNS LIST 1 lateral frame
2 wheel house upper member
3 wheel house lower member (bending frame)
4 upper bending section
5 lower bending section (bending section)
6 outer panel (first panel)
7 inner panel (second panel)
8 rectangular closed cross-sectional portion
9 inner curved surface
10 outer curved surface
11 inner side ridge (of lower bending section)
11A outer side ridge (of upper bending section)
12 outer side ridge (of lower bending section)
12A inner side ridge (of upper bending section)
13 depression
14 bulge
15 elongated hole
16 through-hole
17 notch
18 stiffener
18D notch
19 recessed portion
31 front side frame
35 gusset

The invention claimed is:

1. A vehicle body frame structure comprising a bending frame with a bending section, the bending frame comprising a first panel and a second panel,
wherein the first panel comprises: a first surface portion having a curved surface on the bending section; and a second surface portion substantially perpendicular to the first surface portion, and the first panel has a substantially L-shaped cross section,
wherein the second panel comprises: a third surface having a curved surface on the bending section; and a fourth surface portion substantially perpendicular to the third surface portion,
wherein the first panel and the second panel together define a rectangular closed cross-sectional portion,
wherein an inner curved surface side ridge is formed on the bending section of the first panel,
wherein the bending frame includes:
a depression formed on the inner curved surface side ridge, the depression having a substantially oval shape and depressed toward an inside of the rectangular closed cross-sectional portion to induce deformation of the bending section upon receipt of a collision load;
a bulge formed on the second surface portion, the bulge located below the depression and protruding outward; and
an elongated hole formed through the second surface portion, the elongated hole located below the bulge and extending substantially in parallel with the depression, and
wherein the depression has a bottom surface with an upwardly directed concave arc shape as viewed in the vehicle width direction, and the elongated hole and the bulge each have an upwardly directed concave arc shape substantially in accordance with the upwardly directed concave arc shape of the bottom surface of the depression.

2. The vehicle body frame structure of claim 1,
wherein opposite flanges of the first panel and opposite flanges of the second panel are respectively overlapped with and joined to each other to form the rectangular closed cross-sectional portion.

3. The vehicle body frame structure of claim 2,
wherein an outer curved surface ridge is formed on the bending section of the second panel, and
wherein a through-hole is formed on the outer curved surface side ridge.

4. The vehicle body frame structure of claim 2,
wherein the flanges of the first panel and the second panel have a notch on the bending section.

5. The vehicle body frame structure of claim 1, further comprising a front side frame and a lateral frame disposed on an outer side of the front side frame in the vehicle width direction,
wherein the lateral frame comprises:
a wheel house upper member with a rear end connected to a front pillar; and
a wheel house lower member having an upper bending section, a lower bending section, and a front end, the wheel house lower member extending from the wheel house upper member forward and downward via the upper bending section and the lower bending section, the front end being located at substantially the same position as a front end of the front side frame with respect to a front-rear direction and an up-down direction, and
wherein the bending section the lower bending section of the wheel house lower member.

6. A vehicle body frame structure comprising a front side frame and a lateral frame disposed on an outer side of the front side frame in the vehicle width direction,
wherein the lateral frame comprises:
a wheel house upper member with a rear end connected to a front pillar; and
a wheel house lower member having an upper bending section, a lower bending section, and a front end, the wheel house lower member extending from the wheel house upper member forward and downward via the upper bending section and the lower bending section, the front end located at substantially the same position as a front end of the front side frame with respect to a front-rear direction and an up-down direction,
wherein the wheel house lower member comprises a first panel and a second panel, the first and second panels defining a bending section, wherein the first panel comprises: a first surface portion having a curved surface on the bending section; and a second surface portion substantially perpendicular to the first surface portion and defines a substantially L-shaped cross section, wherein the second panel comprises: a third surface portion having a curved surface on the bending section; and a fourth surface portion substantially perpendicular to the third surface portion, wherein the first panel and the second panel together define a rectangular closed cross-sectional portion, wherein an inner curved surface side ridge is formed on the upper bending section of the second panel, wherein a stiffener is disposed inside the wheel house lower member, the stiffener extending across the upper bending section in the front-rear direction and covering a peripheral portion of the inner curved surface side ridge of the second panel, wherein a recessed portion is formed on the inner curved surface side ridge of the upper bending section of the second panel to induce deformation of the upper bending section upon receipt of a collision load, and wherein the stiffener has a notch avoiding interference with the recessed portion.

7. The vehicle body frame structure of claim 6, further comprising a gusset that connects a front end of the lateral frame to the front end of the front side frame, wherein, when a frontal collision load is applied to the vehicle body frame structure, a front section of the lateral frame is bent in a substantially Z shape with the upper bending section and the lower bending section being bending points and a front section of the front side frame is bent in a substantially V shape inward in the vehicle width direction.

\* \* \* \* \*